F. A. PUFFER.
AUXILIARY OVEN RACK.
APPLICATION FILED APR. 27, 1908.

917,131.

Patented Apr. 6, 1909.

Witnesses

Inventor
Floyd A. Puffer
by H. B. Willson &Co.
Attorneys

UNITED STATES PATENT OFFICE.

FLOYD A. PUFFER, OF PORTER, MICHIGAN.

AUXILIARY OVEN-RACK.

No. 917,131.  Specification of Letters Patent.  Patented April 6, 1909.

Application filed April 27, 1908. Serial No. 429,406.

*To all whom it may concern:*

Be it known that I, FLOYD A. PUFFER, a citizen of the United States, residing at Porter, in the county of Midland and State of Michigan, have invented certain new and useful Improvements in Auxiliary Oven-Racks; and I do declare the following to be a full, clear, and exact description of the invention, such as will enable others skilled in the art to which it appertains to make and use the same.

This invention relates to an improved auxiliary rack for ovens.

The object of the invention is to provide a vessel supporting device or rack for supporting a third pan within an oven when two other vessels are already disposed therein side by side or for supporting one pan above the other, permitting a free circulation of heat between them.

With these and other objects in view, the invention consists of certain novel features of construction, combination and arrangement of parts as will be more fully described and particularly pointed out in the appended claims.

Figure 1:
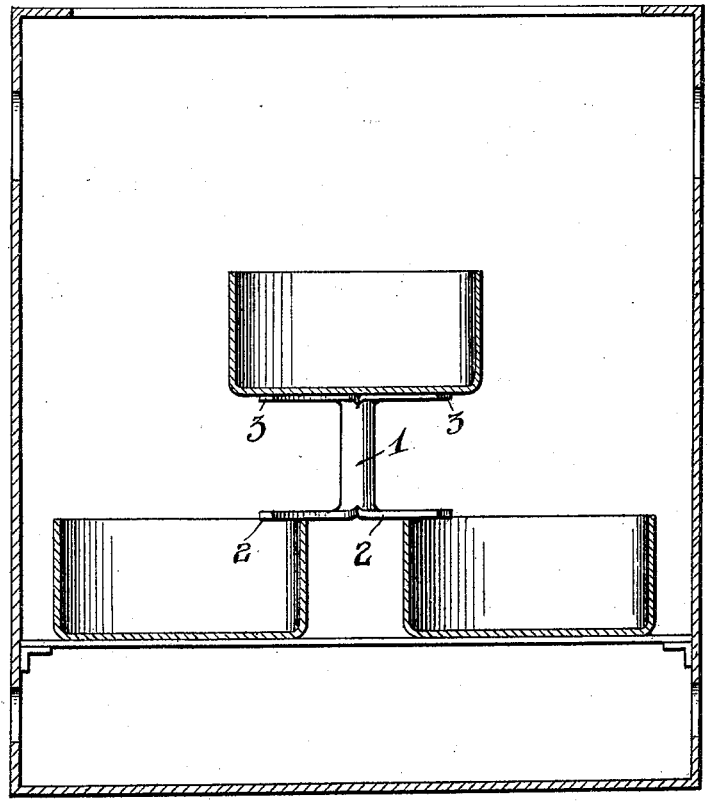
Figure 2:
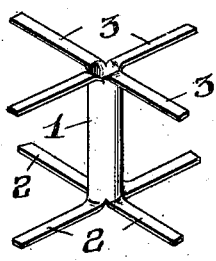

In the accompanying drawings, Figure 1 represents a front elevation of an oven with this improved device in operation therein; Fig. 2 is a perspective view of the device removed from the oven. In the embodiment illustrated, this improved auxiliary rack is made from a sheet metal tube 1 which is slit longitudinally at both ends and the members formed by these slits are bent at one end outwardly at right angles to form the base support composed of the radially extending arms 2 and at the other end to form the pan support composed of the radially extending arms 3.

When two pans or other vessels are arranged in an oven side by side and it is desired to place another pan therein, this improved auxiliary rack is disposed on the adjacent edges of the two pans as shown in Fig. 1 and the upright member 1 thereof spaces the pan supporting arms 3 a sufficient distance above the other pans to permit free circulation of heat therebetween.

From the foregoing description, taken in connection with the accompanying drawings, the construction and operation of the invention will be readily understood without requiring a more extended explanation.

Various changes in the form, proportion and the minor details of construction, may be resorted to without departing from the principle or sacrificing any of the advantages of the invention as defined in the appended claims.

I claim as my invention:—

1. An auxiliary oven rack composed of a tubular member having one end slit longitudinally and bent to form laterally extending supporting arms, and supporting means arranged at its other end.

2. An auxiliary oven rack composed of a tubular member having its opposite ends slit longitudinally with the slit portions bent outwardly at right angles to form laterally extending supporting arms.

In testimony whereof I have hereunto set my hand in presence of two subscribing witnesses.

FLOYD A. PUFFER.

Witnesses:
CLAIR VAN EPPS,
FARQUHRSON G. HEMINGER.